United States Patent [19]
Reising

[11] Patent Number: 5,104,069
[45] Date of Patent: Apr. 14, 1992

[54] APPARATUS AND METHOD FOR EJECTING MATTER FROM AN AIRCRAFT

[75] Inventor: Laurence A. Reising, Seattle, Wash.

[73] Assignee: The Boeing Company, Seattle, Wash.

[21] Appl. No.: 604,471

[22] Filed: Oct. 29, 1990

[51] Int. Cl.⁵ .............................................. B64D 1/00
[52] U.S. Cl. ................................. 244/136; 244/129.1; 60/39.094
[58] Field of Search ............... 244/53 R, 57, 129.1, 244/136; 60/39.094; 239/171

[56] References Cited

U.S. PATENT DOCUMENTS

| | | | |
|---|---|---|---|
| 1,101,699 | 4/1912 | Klein | 60/323 |
| 1,635,938 | 7/1927 | Hudson | 60/316 |
| 1,874,406 | 8/1932 | Wright | 244/53 R |
| 1,892,132 | 12/1932 | Berney | 244/136 |
| 1,957,075 | 5/1934 | Morgensen | 244/136 |
| 2,446,013 | 7/1948 | Kuyper | 60/39.094 |
| 2,476,171 | 7/1949 | Williams, Jr. | 239/171 X |
| 2,582,678 | 1/1952 | Carberry | 244/136 |
| 2,730,402 | 1/1956 | Whiting, Jr. et al. | 244/136 |
| 2,841,245 | 5/1956 | Colgan | 180/69.1 |
| 2,868,329 | 6/1959 | Phelps | 184/106 |
| 3,556,444 | 1/1971 | Kopp | 60/39.094 X |
| 3,747,874 | 7/1973 | Johnsen | 244/53 R |

Primary Examiner—Joseph F. Peters, Jr.
Assistant Examiner—Carla Mattix
Attorney, Agent, or Firm—R. H. Sproule; B. A. Donahue

[57] ABSTRACT

A fluid ejector for discharging gases and fluids from an aircraft. The fluid ejector is fastened to an exterior surface of the aircraft and includes an air tube which is spaced apart from the exterior surface of the aircraft by a mast. Unwanted fluids and gases are evacuated from the aircraft through a conduit located inside the drain mast and are expelled from an outlet located in the side of the air tube. In this manner, the liquid or gases present at the outlet are discharged in a rearward direction away from the downstream portion of the aircraft by the airstream through the tube.

2 Claims, 1 Drawing Sheet

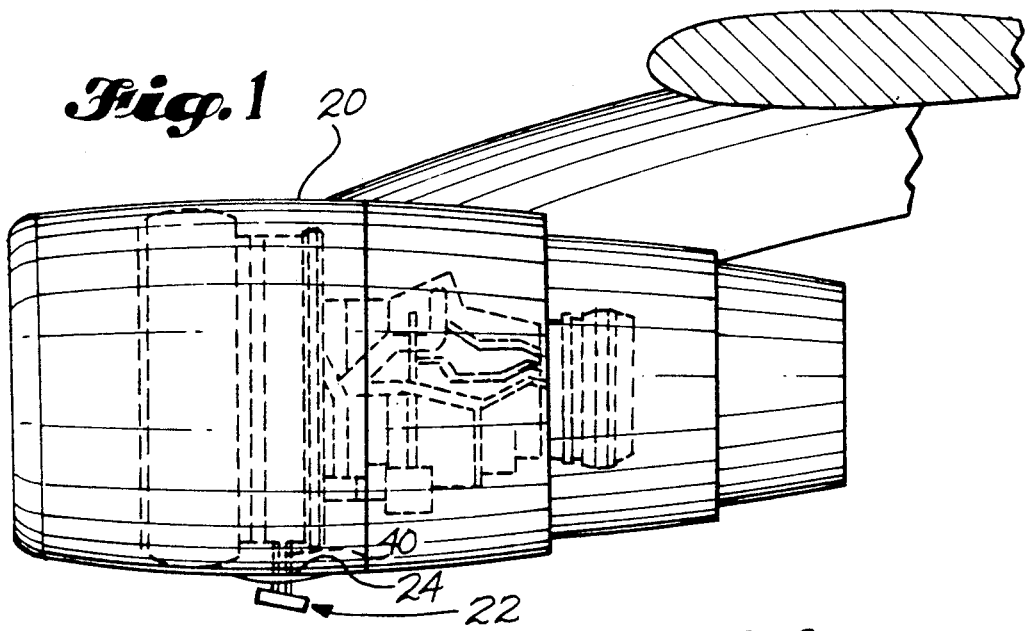
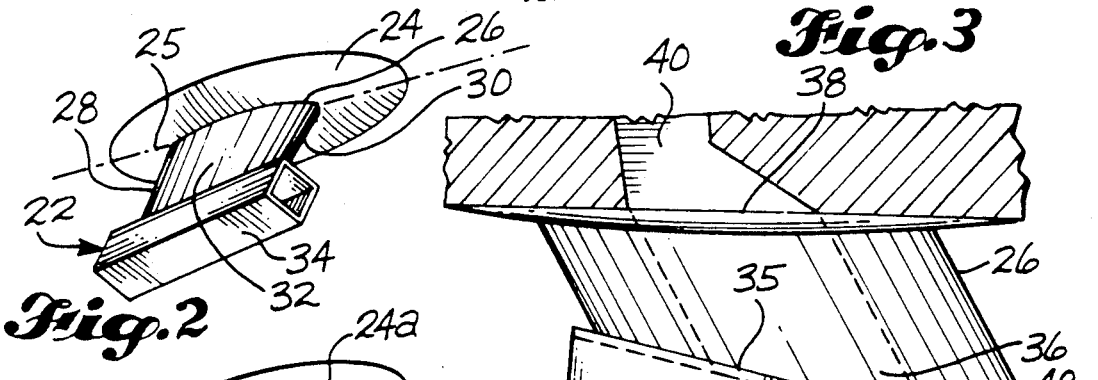
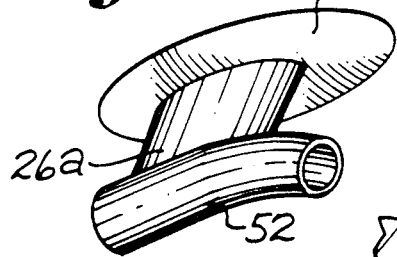
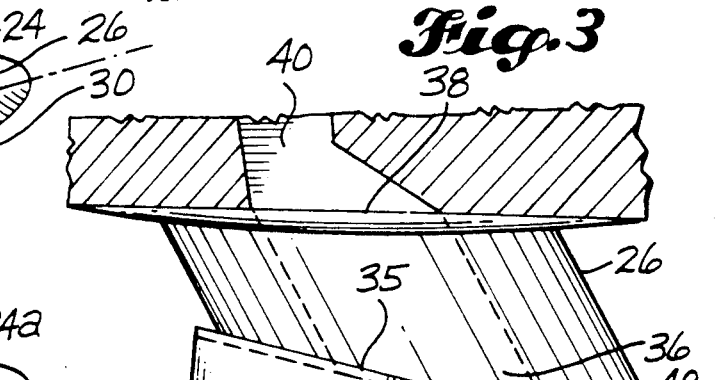
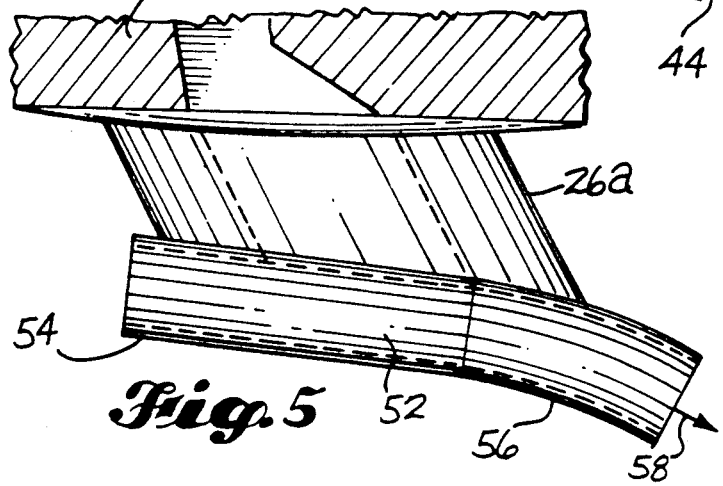

APPARATUS AND METHOD FOR EJECTING MATTER FROM AN AIRCRAFT

TECHNICAL FIELD

The present invention pertains to apparatus for ejecting matter, such as gases and fluids, from an aircraft so as to prevent the matter from contacting a downstream portion of the aircraft.

BACKGROUND OF THE INVENTION

Commercial aircraft include various fluid drain masts which eject fluids, such as oil, waste gases and other liquids, from one or more exterior locations on the aircraft. For example, on some jet engines oil from the engine gearbox is allowed to drain out of a mast located at the bottom of the engine nacelle.

A problem associated with conventional fluid drain masts results when the ejected oil or corrosive liquid contacts a downstream portion of the aircraft leaving an unsightly stain on the aircraft.

Conventionally, a number of drain apparatus have been disclosed. For example, U.S. Pat. No. 2,868,329 by Phelps discloses a device for collecting oil which has escaped from an automobile engine and which is ejected by the airstream when the automobile is in motion. Furthermore, U.S. Pat. No. 1,957,075 by Morgensen, Jr. discloses an airplane spraying device which uses the airplane's airstream to cause liquid to be evacuated from a holding tank and to be discharged into the atmosphere as a spray.

SUMMARY OF THE INVENTION

The present invention pertains to apparatus for ejecting matter, such as unwanted liquids and gases, from an aircraft. The apparatus includes a tube for receiving air therethrough caused by forward movement of the aircraft such that the air enters an inlet end of the tube and exits a discharge end of the tube. Also included is a mast having an inner end which is fastened to an exterior surface of the aircraft and an outer end which supports the tube. The mast also includes a conduit having an inner end for receiving the matter from the aircraft and an outer end for discharging the matter through an opening in a side of the tube such that the air entering the tube causes the matter to be discharged out the discharge end of the tube. The mast supports the tube in a manner that the outlet end of the tube is spaced further away from the surface of the aircraft than the inlet end so that the matter discharged from the tube is directed into the airstream and away from a downstream portion of the aircraft.

BRIEF DESCRIPTION OF THE DRAWINGS

The present invention will be described in greater detail in the following Detailed Description in conjunction with the attached drawings, in which:

FIG. 1 is a side view of an exemplary embodiment of the fluid ejector of the present invention which is connected to an aircraft engine nacelle;

FIG. 2 is an isometric view of the fluid ejector shown in FIG. 1;

FIG. 3 is a side sectional view of the fluid ejector shown in FIG. 1;

FIG. 4 is an isometric view of another embodiment of the present invention; and

FIG. 5 is a side sectional view of the embodiment shown in FIG. 4.

DETAILED DESCRIPTION

The present invention pertains to a device for ejecting fluid from an aircraft. In the following detailed description the present invention will be described for application in evacuating oil from an aircraft engine nacelle. It should be appreciated, however, that the present invention may be used to evacuate other fluids and gases from an aircraft.

Referring first to FIG. 1, there is shown a conventional aircraft engine nacelle indicated at 20 to which there is attached at the bottom of the nacelle a unique fluid ejector indicated at 22. As shown in FIG. 2, the fluid ejector 22 includes a base 24 having a configuration which is contoured to match the nacelle and which has an imaginary lengthwise axis shown by a dashed line identified by the number 25. The base 24 is attached to the outer surface of the nacelle 20 by conventional fasteners (not shown). Mounted perpendicular to the base 24 is a mast 26 having a thin leading edge 28 and a trailing edge 30 which are aligned with lengthwise axis 25, as well as curved sides 32 which extend in a lengthwise manner between the leading edge 28 and trailing edge 30.

The fluid ejector 22 also includes an elongate air tube 34 which is attached to the outer end of the mast 26 in a manner parallel to the lengthwise axis 25 such that the air tube is outside the boundary layer which flows adjacent to the aircraft surface. In the present embodiment, the tube 34 has a square cross-sectional configuration. Air flowing through the tube 34 resulting from movement of the aircraft creates a Venturi effect at an opening 35 (FIG. 3) in the side of the tube 34 which leads to a conduit 36 (FIG. 3). The conduit 36 extends between the tube 34 and an outlet 38 at the inner surface of the nacelle 22 which is connected to a drain line 40 (for oil or any other fluid) leading from the aircraft engine (not shown) or any other aircraft component requiring drainage. In this manner, any fluid in the drain line is evacuated under a pressure differential at the outlet 35 and discharged with an outward vector into the airstream out the back of the tube 34.

As shown in FIG. 3, the tube 34 includes an inlet 42 for receiving air, and an outlet 44 for discharging a mixture of air and oil. In order to direct the oil away from downstream portions of the nacelle and aircraft, the tube 34 is mounted to the mast 26 so that it tapers away from the nacelle in a fore-to-aft direction. In other words, the outlet end 44 is spaced further away from the nacelle than the inlet end 42. In this manner, the oil is discharged along a direction shown by the arrow 48 which carries the oil away from the nacelle and fuselage thereby avoiding any downstream contact with the aircraft.

It has been found that simply lengthening the mast 26 to place the air tube at a greater distance from the aircraft does not solve the problem of downstream contact with the aircraft surface. However, in the present invention, the air tube 34 applies a sufficient outward vector to the discharged matter that the airstream carries it off before it can contact the aircraft's downstream surface.

In the present invention, the configuration and location of the fluid ejector may vary depending upon such factors as range in aircraft airspeed, downstream aircraft structure, allowable drag, and suction requirements. Optimization of the fluid ejector installation may require changes in the mast angle, length and cross sectional area of the tube, and length of the mast.

In another embodiment of the present invention shown in FIGS. 4 and 5, like elements described in previous embodiments are identified by like numerals with the suffix "a" attached. In the present embodiment, there is shown a tube 52 which is attached to the mast 26a. The tube 52 includes (i) a forward portion 54 which is tapered away from the nacelle surface when proceeding in a fore-to-aft direction, and (ii) an aft portion 56 which curves away from the nacelle 20b at an angle of about thirty degrees. In this manner, the evacuated oil and gas mixture is directed away from downsteam Portions of the nacelle and aircraft in the direction of an arrow identified by the number 58. In the present embodiment the tube 52 has a circular cross-sectional configuration.

What is claimed is:

1. In an aircraft having an engine which leaks oil from a component of the engine, apparatus comprising:
   a. a drain line having a first end for receiving the oil from the engine component and a second end;
   b. a tube for receiving air therethrough caused by forward movement of the aircraft such that the air enters an inlet end of the tube and exits a discharge end of the tube; and
   c. a mast having an inner end which is fastened to the aircraft and an outer end which supports the tube, the mast also including a conduit having an inner end which is connected to the second end of the drain line for receiving the oil from the engine component and an outer end for discharging the oil through an opening in a side of the tube such that the air entering the tube causes the oil to be discharged out the discharge end of the tube, the mast supporting the tube in a manner that the outlet end of the tube is spaced further away from the surface of the aircraft than the inlet end so that the oil discharged from the tube is directed away from a downstream portion of the aircraft.

2. In an aircraft having a component which leaks liquid, apparatus for ejecting the liquid from the aircraft, the apparatus comprising:
   a. a drain line having a first end for receiving the liquid from the component and a second end;
   b. a tube for receiving air therethrough caused by forward movement of the aircraft such that the air enters an inlet end of the tube and exits a discharge end of the tube; and
   c. a mast having an inner end which is fastened to the aircraft and an outer end which supports the tube, the mast also including a conduit having an inner end for receiving the liquid from the aircraft and an outer end for discharging the liquid through an opening in a side of the tube such that the air entering the tube causes the liquid to be discharged out the discharge end of the tube, the mast supporting the tube in a manner that the distance between the tube and the aircraft surface increases when proceeding from the inlet end to the discharge end of the tube so that the liquid discharged from the tube is directed away from a downstream portion of the aircraft.

* * * * *